US009189119B2

(12) United States Patent
Liao et al.

(10) Patent No.: US 9,189,119 B2
(45) Date of Patent: Nov. 17, 2015

(54) TOUCH RECOGNITION METHOD AND TOUCH PANEL THEREOF

(71) Applicants: APEX MATERIAL TECHNOLOGY CORP., Keelung (TW); IMAGINATION BROADWAY LTD., New Taipei (TW)

(72) Inventors: Zong-Bin Liao, Keelung (TW); Hong-Lun Su, Keelung (TW); Zhong-peng Qiu, Keelung (TW)

(73) Assignees: APEX MATERIAL TECHNOLOGY CORP., Keelung (TW); IMAGINATION BROADWAY LTD., New Taipei (TW)

( * ) Notice: Subject to any disclaimer, the term of this patent is extended or adjusted under 35 U.S.C. 154(b) by 0 days.

(21) Appl. No.: 14/486,039

(22) Filed: Sep. 15, 2014

(65) Prior Publication Data

US 2015/0077388 A1 Mar. 19, 2015

(30) Foreign Application Priority Data

Sep. 13, 2013 (TW) ............................ 102133071 A

(51) Int. Cl.

*G06F 3/044* (2006.01)
*G06F 3/041* (2006.01)

(52) U.S. Cl.

CPC .............. *G06F 3/044* (2013.01); *G06F 3/0418* (2013.01)

(58) Field of Classification Search

CPC .............................. G06F 3/044; G06F 3/0418
See application file for complete search history.

(56) References Cited

U.S. PATENT DOCUMENTS

2012/0249470 A1* 10/2012 Sugiura ................ G06F 1/1694 345/174
2013/0207935 A1* 8/2013 Toda et al. .............. G06F 3/044 345/174
2013/0234985 A1* 9/2013 Huang .................. G06F 3/0418 345/174
2014/0306924 A1* 10/2014 Lin ...................... G06F 3/0418 345/174
2015/0049043 A1* 2/2015 Yousefpor .............. G06F 3/044 345/174
2015/0049044 A1* 2/2015 Yousefpor .............. G06F 3/044 345/174
2015/0077394 A1* 3/2015 Dai ....................... G06F 3/044 345/174

* cited by examiner

*Primary Examiner* — Lun-Yi Lao
*Assistant Examiner* — Kelly B Hegarty
(74) *Attorney, Agent, or Firm* — WPAT, PC; Justin King

(57) ABSTRACT

A method for identifying a contact with a touch panel includes: performing a first measuring process for obtaining a baseline signal; performing a second measuring process for obtaining a contact signal if there are any contacts or approaches of the touch panel with objects; comparing the values of the baseline signal with the contact signal for generating the contact signal with a location information; performing a third measuring process for installing an exclusion area according to the baseline signal; determining whether the location information is in the exclusion area; and, discarding the location information if the location information is in the exclusion area.

19 Claims, 10 Drawing Sheets

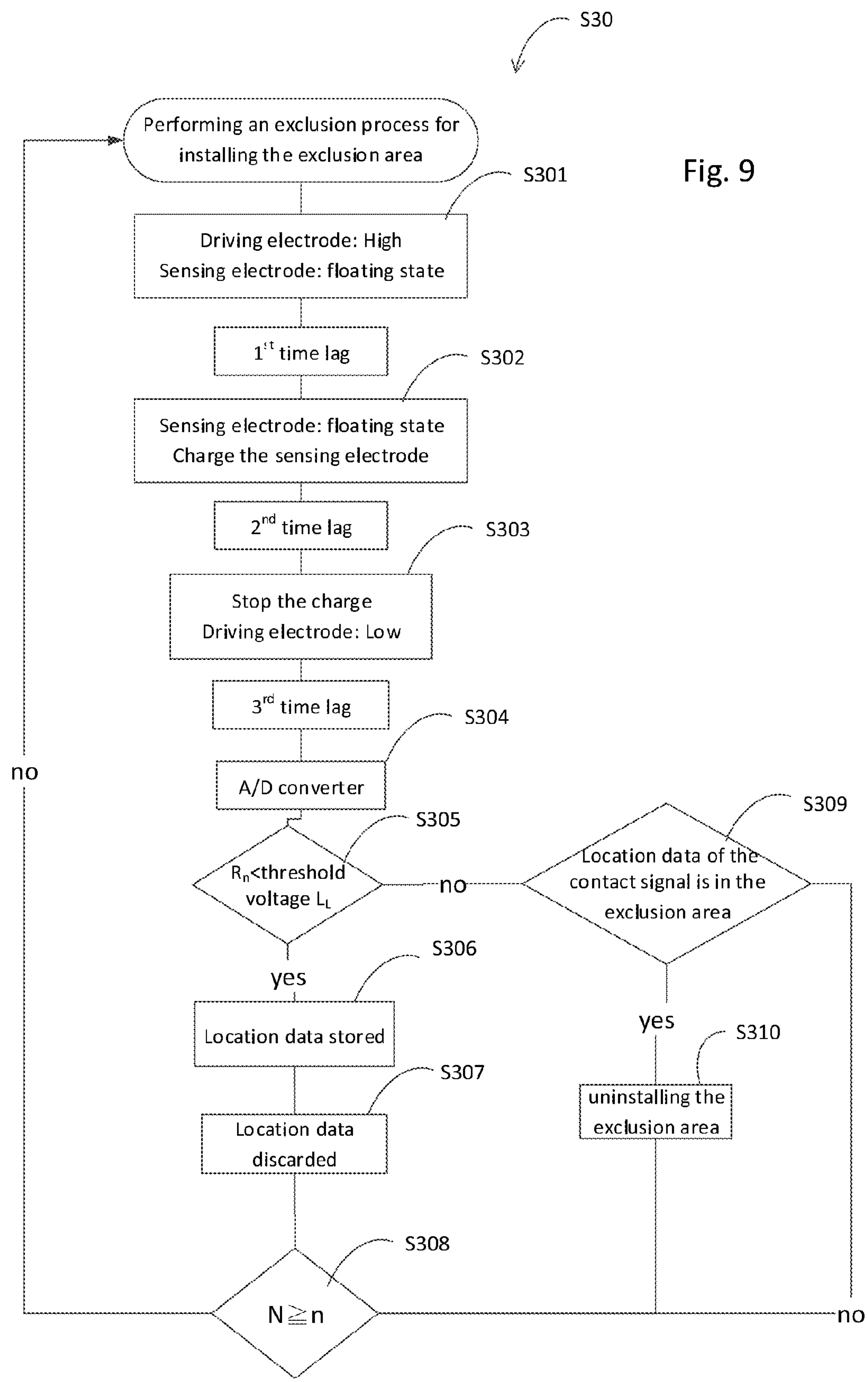
S30
Performing an exclusion process for installing the exclusion area
S301
Fig. 9
Driving electrode: High
Sensing electrode: floating state
1st time lag
S302
Sensing electrode: floating state
Charge the sensing electrode
2nd time lag
S303
Stop the charge
Driving electrode: Low
3rd time lag
S304
A/D converter
no
S305
Rn<threshold voltage LL
no
S309
Location data of the contact signal is in the exclusion area
yes
S306
Location data stored
yes
S310
uninstalling the exclusion area
S307
Location data discarded
S308
N≧n
no

TOUCH RECOGNITION METHOD AND TOUCH PANEL THEREOF

CROSS-REFERENCE TO RELATED APPLICATIONS

This application claims the benefit of priority to Taiwan patent application Ser. No. 102133071, filed Sep. 13, 2013, which is also incorporated herein by reference.

FIELD OF THE INVENTION

The present invention pertains to a method for sensing variation of electric field to identify the location of a contact, and more particularly pertains to a method for accurately identifying the location of contact even with polar mediums, such as a drop of liquid etc., existing on the surface of a touch panel.

BACKGROUND OF THE INVENTION

A touch panel, working as a location recognition device, can ingeniously combine input and display interfaces, and therefore has the advantages of being space saving and user-friendly operated. Nowadays it has been generally applied to a wide variety of consumer or industrial electronics, for example, PDAs (Personal Digital Assistant), palm-sized PCs (Personal Computers), tablet computers, mobile phones, handwriting input devices for a smart phone, IAs (Information Appliances), ATMs (Automated Teller Machines) and POS (Points of Sale) etc., which can generally be seen in various kinds of application occasions in business and industry.

Among various types of location recognition devices, those using projected-capacitive touch technology are most popular. This technology utilizes conductive materials and capacitors to form a projection of an electric field, and then senses a change caused by other conductive materials such as fingers approaching or touching the electric field. Devices based on this technology can react more quickly due to high transmissivity and sensitivity. Furthermore, they are also good at durability since their touch screens can be made entirely of plain glass, allowing them to be immune to fire, smudges, and scratches. In addition to this, these devices have the capability of sensing as many fingers as can fit on their screens, and therefore provide a more human-oriented way to operate them. Compared to their counterparts, location recognition devices with projected-capacitive touch technology have been most favorable as a consequence of the aforementioned merits.

Projected-capacitive touch panels use a capacitive sensor to sense multiple locations where pointing objects such as a user's fingers land on the capacitive sensor. For instance, where pointing objects locate on the touch panels can be determined by measuring a capacitance change between a sensing electrode and a constant potential reference, such as ground, in this system. Projected-capacitive touch panels are made with a first conductive layer formed on a substrate in the first place, and then multiple driving electrodes, electrically insulated one from another, are formed by etching. A second conductive layer is sequentially formed on another substrate and multiple electrically insulated sensing electrodes are also formed by etching. A plurality of intersections are then formed on the surface of the projected-capacitive touch panels, wherein a driving electrode is paired with a sensing electrode at each intersection because the electrodes on one of the two layers are arranged in rows and those on the other layer are in columns; the intersections of each row and column represent unique touch coordinate pairs. A conventional location recognition device usually comprises a said projected-capacitive touch panel, a controller, a driving circuit coupled to each of driving electrodes and a sensing circuit coupled to each of sensing electrodes. Said capacitive sensor is included in the sensing circuit.

As shown in FIG. 1A, a controller (not shown) charges multiple driving electrodes 10 in sequence in the first place during which an inductive electric-field channel E is formed between a driving electrode 10 and a sensing electrode 20. Each inductive electric-field channels E has a capacitance value. When an inductive electric-field cannel E is formed between the driving electrode 10 and the sensing electrode 20 without any other medium to intervene, the capacitance between the electrodes is a constant value, and the voltage is also kept to a constant basic voltage value. When a touch object such as a finger intervenes in the inductive electric-field channel E, the variation of the capacitance happens and, in consequence, the voltage drops there. By this characteristic, a contact on the touch panel can be located, as shown in FIG. 1B.

The principle of the above projected-capacitive touch panels will be explained hereafter using conductors and physical properties thereof, such as electric charges and capacitances. Refer to FIG. 2A, the capacitance for a certain conductor is a constant value, which relates to the size and shape of the conductor but does not relate to the material the conductor is made of, the number of electric charges or whether there is an electric charge on the conductor. A conductor in electrostatic equilibrium is an equipotential body. For an independent conductor, its electromotive fore is related with the electric charges it carries. When the number of electric charges increases, the strength of the electric field provoked by them at each of the points also proportionally increases. As a consequence, the work done by electric-field force to move an electric charge q also increases by the same multiple. The electric charge q is proportional to the electromotive force U, and the capacitance C is given by $C=q/U$. Refer to FIG. 2B, the charges on a plate A is +q in a vacuum, and the electromotive force is given by U. A plate B is put near plate A as shown in FIG. 2C, and the same charges −q and +q are induced on two sides of plate B by plate A due to electrostatic induction. The electromotive force U on plate A is equal to the electric field induced by the charge +q on plate A and the charges −q and +q on plate B, which is summed by the law of algebraic addition. Refer to FIG. 2D, the charge +q on plate B is neutralized when plate B is connected to the ground, so the electromotive force on plate A decreases. The capacitance increases as the charge q on plate A remains the same. A dielectric object D is put between plates A and B as shown in FIG. 2E. The negative charge −q is induced by the dielectric object D near one side of plate A, and the positive charge +q is induced by the dielectric object D near one side of plate B. Thus, the electromotive force on plate A decreases, and the capacitance increases.

Back to FIGS. 1A and 1B, the conventional identifying method of the projected-capacitive touch panel is disclosed as below. The controller charges multiple driving electrodes with a driving circuit, coupling electric charges to each of the driving electrodes simultaneously, sequentially, or group-by-group, and then coupling the electric charges to each of the induced channels through the electric field. Then, each capacitive sensor in the sensor circuits is respectively coupled to a corresponding induced channel in order to transfer the induced charges in the channel to its corresponding capacitive sensor for measuring. Usually, the controller performs multiple measuring cycles before measures the charges on the capacitive sensor. When a touch object, for example, finger or stylus approaches the sensing electrodes 20, the touch object is taken as a virtual ground. It changes the capacitance between the sensing electrodes and the ground. Thus, the capacitive sensor measures the variation of the charges for identifying the location of contact.

However, the change of the capacitance causes the variation of the voltages, which is measured by the projected-capacitive touch panel with the principle of the electric field, in order to identifying the contact of the touch object. When there are medium other than the touch object contacting the touch panel, it also changes the capacitance value between the driving electrode 10 and the sensing electrode 20 and the voltage is dropped which intervenes the identification and generates noises. Dielectric properties of the other medium cause different effects. For example, when there is polar medium (e.g., liquid) on the touch panel, it may be induced by the positive charges on the driving electrode and generates polarization phenomena. As the induced channel between the sensing electrodes and the driving electrodes is intervened, the variation of the charges between them becomes very weak. The polar medium centralizes the negative charges near the driving electrodes and the positive charges far from the driving electrodes respectively, and there are two problems because of the centralizing phenomenon. One is that the sensing electrodes drops due to the increased capacitance value near the driving electrodes. The other is that the induced electric field is erroneous due to the sensing electrodes far from the polar medium generating erroneous location of contact.

Moreover, different shapes of liquid covering on the touch panel cause different effects. When the shape of liquid is a stripe as FIG. 3A and the extending direction of the stripe is the same as the extending direction of the driving electrodes, it makes the capacitance value increase at the liquid covering area but the locating of the contact is not intervened. While the extending direction of liquid intersects the extending direction of the driving electrodes or the sensing electrodes as FIG. 3B, it induces erroneous locating of the contact. Therefore, a method for accurately identify the location of contact is needed.

SUMMARY OF THE PRESENT INVENTION

In light of the aforementioned background of the invention, the present invention provides a touch recognition method for a touch panel. The touch recognition method can distinguish the touch point from other intervened medium for promoting accurate identification.

In order to achieve one, some or all of the above stated objectives and others, the present invention provides a touch recognition method for a touch panel, the touch panel including a plurality of driving electrodes and a plurality of sensing electrodes, the method including: initializing the driving electrodes and the sensing electrodes, including setting the driving electrodes and the sensing electrodes to a state of Low electric potential; charging the driving electrodes to a state of High electric potential; switching the sensing electrodes to a floating state, in the meanwhile, the sensing electrodes are charged for a short period with an integrated circuit including an analog-to-digital converter; stopping the charging of the sensing electrodes, and switching the driving electrodes from the state of High electric potential to the state of Low electric potential, while the senor electrodes are kept on the floating state; and generating a plurality of sensing signals on the sensing electrodes sequentially measured by the analog-to-digital converter. Wherein the sensing signals is defined as a baseline signal if there is no contact or approach on the surface of the touch panel with any object, and the sensing signal is defined as a contact signal if there is any contact or approach on the surface of the touch panel with an object.

In one embodiment, the touch recognition method further includes: comparing the values of the sensing signals with the value of the baseline signal; outputting a positive signal if the value of the sensing signal is higher than or equal to the value of the baseline signal; comparing the value of the positive signal with a first threshold value higher than the value of the baseline signal; and outputting the contact signal with a location information if the value of the positive signal is higher than or equal to the first threshold value.

In one embodiment, the touch recognition method further includes: comparing the values of the sensing signals with the value of the baseline signal; outputting a negative signal if the value of the sensing signal is lower than the value of the baseline signal, the negative signal including a location information; defining the location information as (X,Y) and installing an exclusion area as (X±p, Y±q), wherein the p and the q are nature numbers; comparing the value of the negative signal with a second threshold value lower than the value of the baseline signal; outputting an exceptional signal if the value of the negative signal is lower than the second threshold value; installing the exclusion area according to the exceptional signal; and discarding the location information if the location information is in the exclusion area.

In one embodiment, the touch recognition method further includes: comparing the values of the sensing signals with the value of the baseline signal; outputting a negative signal if the value of the sensing signal is lower than the value of the baseline signal, the negative signal including a location information; defining the location information as (X,Y) and installing an exclusion area as (X±p, Y±q), wherein the p and the q are nature numbers; comparing the value of the negative signal with a second threshold value lower than the value of the baseline signal; outputting an restoring signal if the value of the negative signal is higher than the second threshold value; and uninstalling the exclusion area according to the restoring signal.

In order to achieve one, some or all of the above stated objectives and others, the present invention provides an touch panel, including a plurality of driving electrodes and a plurality of sensing electrodes, and the touch panel includes a plurality of driving circuits, an integrated circuit and a processing module. Each of the driving circuit is electrically connected to the corresponding driving electrode. The integrated circuit includes an analog-to-digital converter and being electrically connected to the sensing electrodes. The processing module is electrically coupled to the driving circuits and the integrated circuit. The processing module delivers a driving signal to the driving circuits for charging the driving electrodes to a state of High electric potential, during when setting the sensing electrodes to a state of Low electric potential. Then, the processing module switches the sensor electrodes to a floating state from the state of Low electric potential while the sensing electrodes are charged for a short period with the integrated circuit. The integrated circuit stops the charging of the sensing electrodes, and the processing module switches the driving electrodes from the state of High electric potential to the state of Low electric potential. A plurality of sensing signals are generated on the sensing electrodes, which are sequentially measured by the analog-to-digital converter. Wherein the sensing signal is defined as a baseline signal if there is no contact or approach on the surface of the touch panel with an object, and the sensing signal is defined as a contact signal if there is any contact or approach on the surface of the touch panel with an object.

In one embodiment, the touch panel further includes a comparator. The comparator compares the values of the sensing signals with the value of the baseline signal, and a positive signal is outputted if the value of the sensing signal is higher than or equal to the value of the baseline signal. Then, the comparator compares the value of the positive signal with a first threshold value higher than the value of the baseline signal, and the contact signal with a location information is outputted if the value of the positive signal is higher than or equal to the first threshold value.

In another embodiment, a negative signal including a location information is outputted if the value of the sensing signal is lower than the value of the baseline signal, wherein the location information is defined as (X,Y) and an exclusion area is installed as (X±p, Y±q), wherein the p and the q are nature numbers. Then, the comparator compares the value of the negative signal with a second threshold value lower than the value of the baseline signal. An exceptional signal is outputted if the value of the negative signal is lower than the second threshold value; however, a restoring signal is outputted if the value of the negative signal is higher than the second threshold value.

In order to achieve one, some or all of the above stated objectives and others, the present invention provides a touch recognition method for a touch panel, the touch panel including a plurality of driving electrodes and a plurality of sensing electrodes, the method includes: performing a first measuring process for obtaining a baseline signal; performing a second measuring process for obtaining a contact signal if there is any contact or approach of the touch panel with an object; comparing the values of the baseline signal with the contact signal for generating the contact signal with a location information; performing a third measuring process for installing an exclusion area according to the baseline signal; determining whether the location information is in the exclusion area; and, discarding the location information if the location information is in the exclusion area.

In one embodiment, the third measuring process further comprising: generating a restoring signal according to the baseline signal and the contact signal with the location information; uninstalling the exclusion area according to the restoring signal; and, transmitting the contact signal with the location information to a register.

BRIEF DESCRIPTION OF THE DRAWINGS

The present invention can be better understood with the following detailed description of the preferred embodiments, with reference made to the accompanying drawings, wherein:

FIG. 9 depicts a flow chart of the exclusion process for installing the exclusion area according to an embodiment of the present invention

DETAILED DESCRIPTION OF THE INVENTION

It is to be understood that both the foregoing general description and the following detailed description are exemplary and explanatory only and are not restrictive of the invention, as claimed. It should be noted that, as used in the specification and the appended claims, the singular forms "a", "an" and "the" include plural referents unless the context clearly dictates otherwise. Thus, for example, reference to "a material" may include mixtures of materials; reference to "a display" may include multiple displays, and the like. References cited herein are hereby incorporated by reference in their entirety, except to the extent that they conflict with teachings explicitly set forth in this specification.

Figure 4:
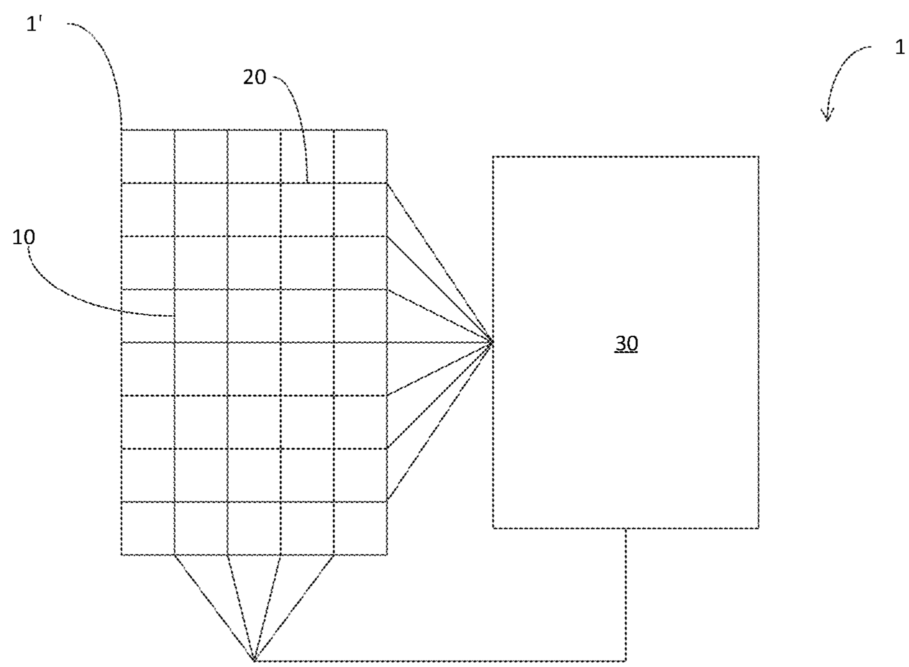
FIG. 4 depicts a diagram of a recognition device.

In an embodiment of the present invention as shown in FIG. 4, a recognition device 1 can be a part of a touchscreen or a part of a touch panel. A plurality of driving electrodes 10 and a plurality of sensing electrodes 20 are intersected and disposed on a substrate 1' of the recognition device 1. The recognition device 1 further includes a processing module 30, which is for controlling and detecting the driving electrodes 10 and the sensing electrodes 20 mentioned above. The driving electrodes 10 are electrically connected to a driving circuit in the processing module 30 while the sensing electrodes 20 for detecting voltage variation are electrically connected to an integrated circuit including a sensing circuit and an analog-to-digital converter both in the processing module 30. A person having ordinary skill in the present art can understand that the processing module 30 can further comprise other elements irrelevant to the present invention and, therefore, not shown in the figures herein.

Figure 5:
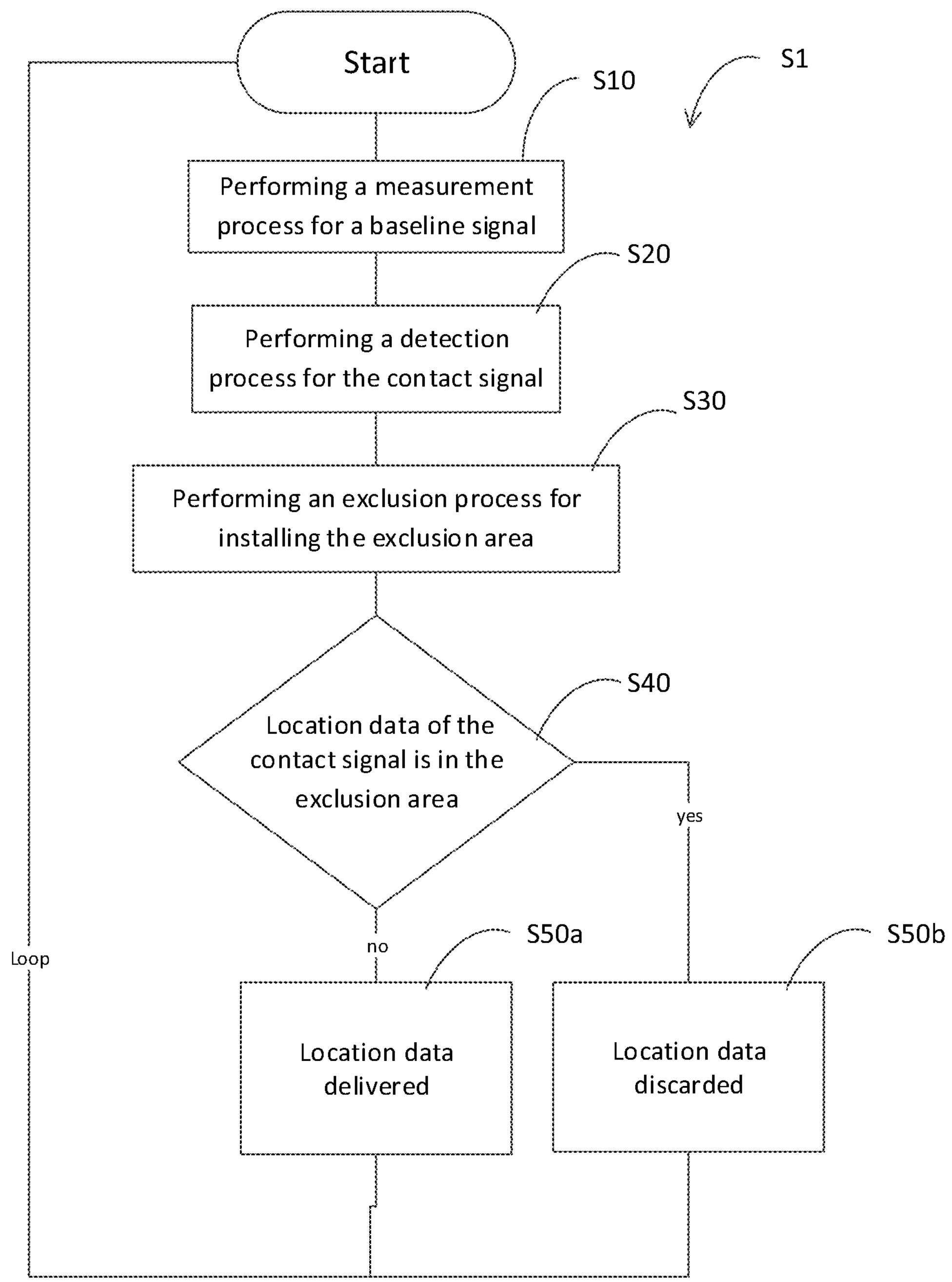
FIG. 5 depicts a flow chart of a touch recognition method for the touch panel according to an embodiment of the present invention.

Please refer to FIG. 5, a flow chart of a touch recognition method S1 for the touch panel according to an embodiment of the present invention. As described before, the method S1 for identifying a contact, run by the processing module 30 including a comparator, can be implemented on the recognition device 1. During practical operation, the method S1 for identifying a contact is run as a loop. In the method S1, each following steps will be triggered to start on measurement when there is any contact or approach on the surface of the touch panel with an object. First, a measurement process for a baseline signal is carried out in step S10. When a pointing object approaches, a detection process for a contact signal will be carried out in step S20. Then, an exclusion process for installing an exclusion area will be carried out in step S30. In step S40, the processing module 30 performs a determining act, which determines whether a location information of the contact signal is in the exclusion area; if not, moving to step S50*a*, the processing module 30 transmits the contact signal with the location information to a register; if yes, moving to step S50*b*, the processing module 30 discards the location information without further acts.

Figure 6:
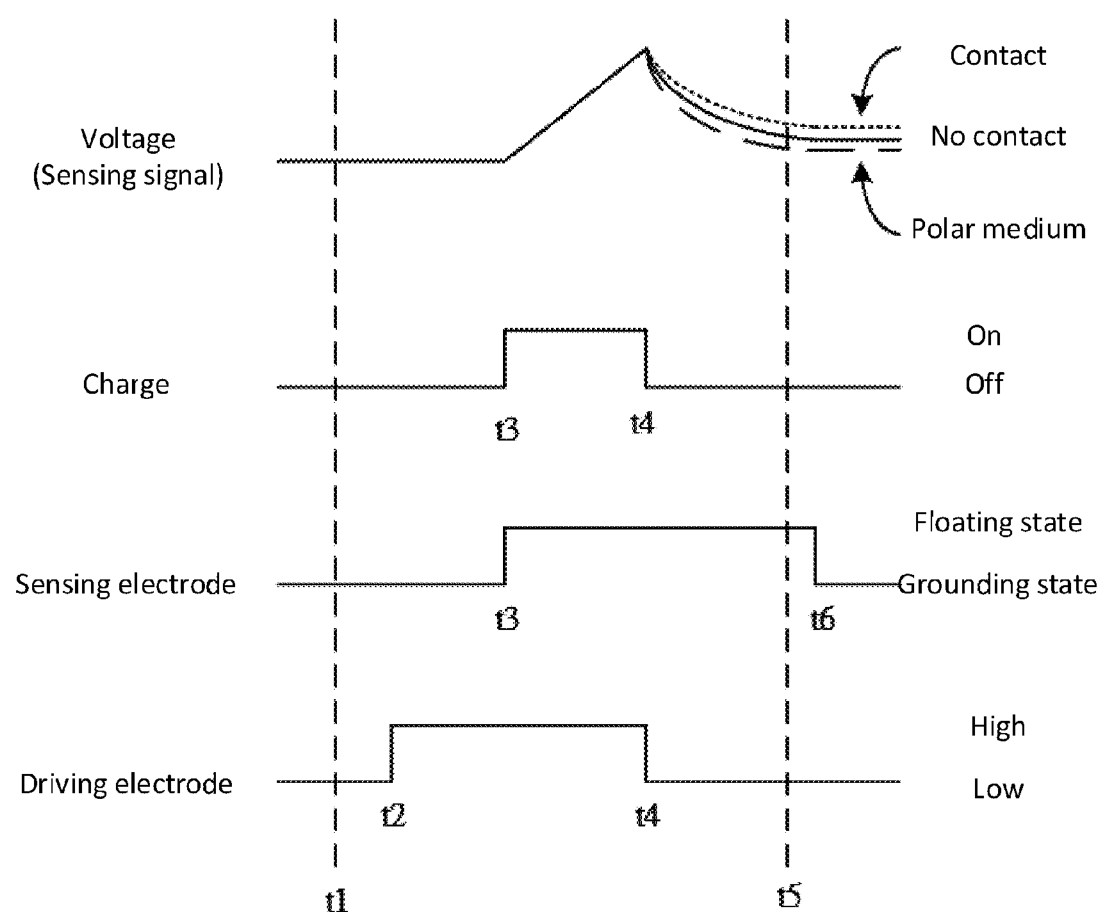
FIG. 6 depicts a signal diagram of performing the touch recognition method.
Figure 7:
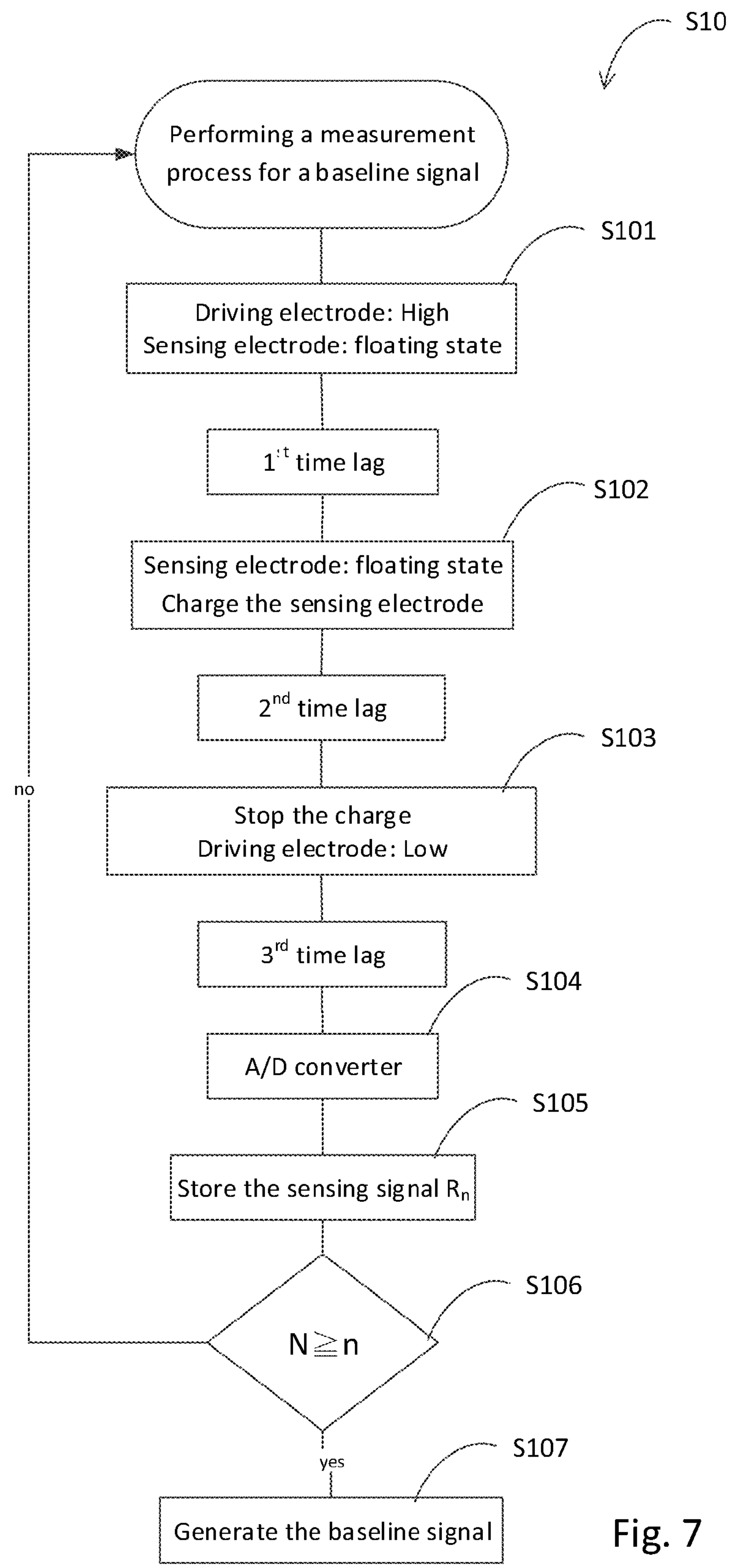
FIG. 7 depicts a flow chart of the measurement process for acquiring the baseline signal according to an embodiment of the present invention.

Please refer to FIG. 6 and FIG. 7, a flow chart of the measurement process in step S10 for acquiring the baseline signal is shown in an embodiment of the present invention. During practical operation, the step S10 is run as a loop.

First, the measurement process is started at time point t1, and the driving electrodes and the sensing electrodes are initialized. The driving electrodes are set to a state of low electric potential, and the sensing electrodes are set to the state of low electric potential including a grounding state. At time point t2 of proceeding the step S101, the driving electrodes 10 are sequentially coupled to a driving signal by the driving circuit and the driving electrodes 10 are charged to a state of high electric potential. Meanwhile, the sensing electrodes 20 remain at the grounded state. During a period between time points t2 and t4, the driving electrodes 10 remain at the state of high electric potential. At time point t3 of proceeding the step S102, the sensing electrodes are switched to a floating state after a first time lag between time points t2 and t3. The sensing electrodes 20 remain at the floating state during a period of time between time points t3 and t6, during when the sensing electrodes are charged for a short period between time points t3 and t4 with an integrated circuit or with an inductive electric-field channel formed between a driving electrode 10 and a sensing electrode 20. The integrated circuit includes an analog-to-digital converter. During a second time lag between time points t4 and t6, proceeding the step S103 for stopping the charge of the sensing electrodes; in the meanwhile, the driving electrodes are connected to ground so switched from the state of high electric potential to the state of low electric potential at time point t4, while the sensor electrodes are kept on the floating state; and then, the sensing electrodes are connected to ground so switched from the floating state to the grounding state at time point t6. In the step S104, a plurality of sensing signals $R_n$ are generated on the sensing electrodes sequentially measured by the analog-to-digital converter after a third time lag, wherein n means the times of the measurement process.

Next, the step S105 is for storing the sensing signals $R_n$ in a register. When the $N^{st}$ measurement process is proceeded, in the step S106, the processing module determines if N for the $N^{st}$ times of the measurement process is larger than or equal to n for the $n^{st}$ of the measurement process. If the times N is smaller than the times n, the processing module repeats the measurement procedure. Until the times N is larger than the times n, the processing module defines a baseline signal. For example, one value of the sensing signals or the mean of the values of the sensing signals is defined as the baseline signal.

Figure 8:
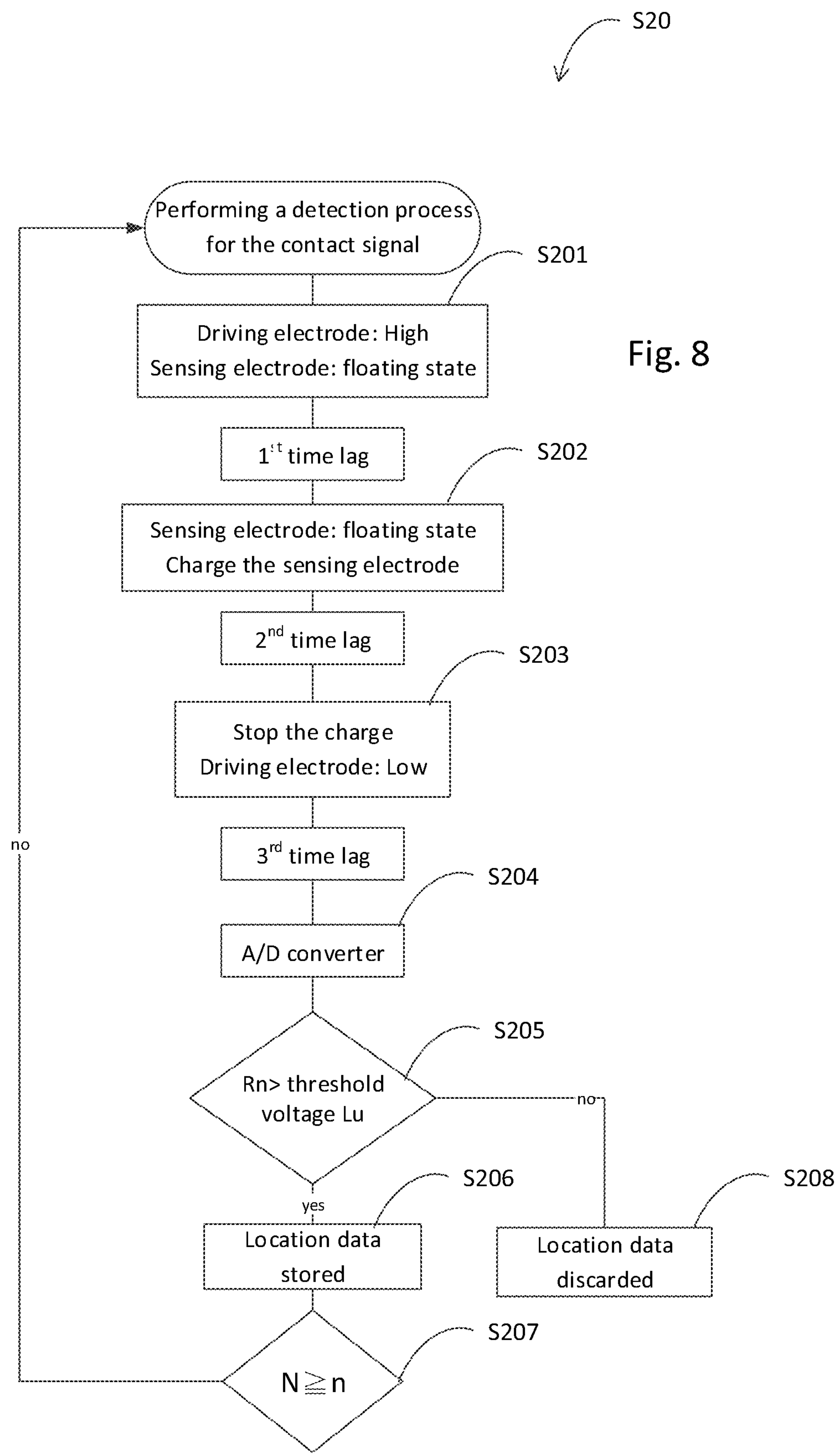
FIG. 8 depicts a flow chart of the detection process for acquiring the contact signal according to an embodiment of the present invention.

Please refer to FIG. 8, a flow chart of the detection process in step S20 for acquiring the contact signal is shown in an embodiment of the present invention. During practical operation, the step S20 is run as a loop. The steps S201 to S204 are respectively the same as the steps S101 to S104, therefore, not repeatedly described herein.

After the step S204 of generating a plurality of sensing signals $R_n$ the analog-to-digital converter, proceed the step S205 of comparing the values of the sensing signals with the value of the baseline signal. A positive signal $R_n$ is outputted if the value of the sensing signal is higher than or equal to the value of the baseline signal; and then, the comparator compares the value of the positive signal $R_n$ with a first threshold value $L_u$, wherein the first threshold value $L_u$ is defined as a value higher than the value of the baseline signal. If the value of the positive signal $R_n$ is higher than or equal to the first threshold value $L_u$, proceed the step S206 of outputting the contact signal with a location information and storing it in the register. Move to the step S207, and the processing module determines if N for the $N^{st}$ times of the detection process is larger than or equal to n for the $n^{st}$ of the detection process; if no, the processing module repeats the detection procedure. However, proceed the step S208 for discarding the contact signal with the location information if the value of the positive signal $R_n$ is smaller than the first threshold value $L_u$.

Please refer to FIG. 9, a flow chart of the exclusion process in step 30 for installing the exclusion area is shown in an embodiment of the present invention. During practical operation, the step S30 is run as a loop. The steps S301 to S304 are respectively the same as the steps S101 to S104, therefore, it is not repeatedly described herein.

After the step S304 of generating a plurality of sensing signals $R_n$ the analog-to-digital converter, proceed the step S305 of comparing the values of the sensing signals with the value of the baseline signal. A negative signal $R_n$ is outputted if the value of the sensing signal is lower than the value of the baseline signal, and the performance relationship between the negative signal and the positive signal in said detection process is opposite. The negative signal includes a location information, and the processing module defines the location information as (X,Y) and installs an exclusion area as (X±p, Y±q), wherein the p and the q are nature numbers. Then, the processing module compares the value of the negative signal $R_n$ with a second threshold value $L_L$, wherein the second threshold value $L_L$ is defined as a value lower than the value of the baseline signal. If the value of the negative signal $R_n$ is lower than the second threshold value $L_L$, proceed the step S306 of storing the negative signal with the location information as (Xn, Ym) and outputting an exceptional signal. The exclusion area $(X_{n-p\sim n+q}, Y_{m-p\sim m+q})$ is installed according to the exceptional signal. In the step S307, the processing module discards another location information (X, Y) if it is in the exclusion area $(X_{n-p\sim n+q}, Y_{m-p\sim m+q})$. Finally, the processing module determines if the $N^{st}$ times of the exclusion process is larger than or equal to the $n^{st}$ of the exclusion process; if no, the processing module repeats the exclusion process.

If the value of the negative signal $R_n$ is higher than or equal to the second threshold value $L_L$, proceed the step S309 of determining if the location information (X, Y) is in the exclusion area $(X_{n-p\sim n+q}, Y_{m-p\sim m+q})$ and outputting an restoring signal. If the location information (X, Y) is in the exclusion area $(X_{n-p\sim n+q}, Y_{m-p\sim m+q})$, proceed the step S310 of uninstalling the exclusion area according to the restoring signal and storing the location information (X, Y) in the register. If not, proceed the step S308 of determines if the $N^{st}$ times of the measurement process is larger than or equal to the $n^{st}$ of the measurement process. If the times N is smaller than the times n, the processing module repeats the exclusion process.

Figure 1A:
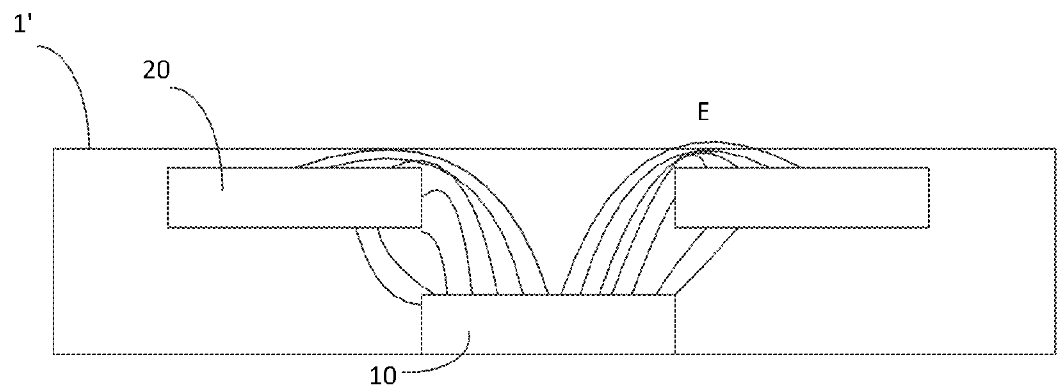
FIGS. 1A and 1B respectively depicts the inductive electric-field channels without contact and with contact on the touch panel.

Refer to FIGS. 1A, 1B, 4 and 10, a touch recognition method in an embodiment is implemented. A plurality of driving electrodes 10 $(X_{1\sim n})$ and a plurality of sensing electrodes 20 $(Y_{1\sim m})$ are intersected and disposed on a substrate 1', and a dielectric layer is disposed between the driving electrodes 10 $(X_{1\sim n})$ and the sensing electrodes 20$(Y_{1\sim m})$, wherein the n and the m are integrals. The measurement process is proceeded by the processing module 30. The inductive electric-field channel $(X_n,Y_m)'$ is formed between the driving electrode 10 $(X_{1\sim n})$ and the sensing electrode 20 $(Y_{1\sim m})$ while each of the driving electrodes 10 is sequentially driven and/or charged by the processing module 30, and the value variation of each of the sensing electrodes 20 $(Y_{1\sim m})$ is sequentially measured. As shown in FIG. 1A, the values of the inductive electric-field channel $(X_n,Y_m)'$ are close in value while there is no contact or approach on the surface of the touch panel with any object. In one embodiment, the mean of the values of the inductive electric-field channel $(X_n,Y_m)'$ is defined as a baseline signal.

Figure 1B:
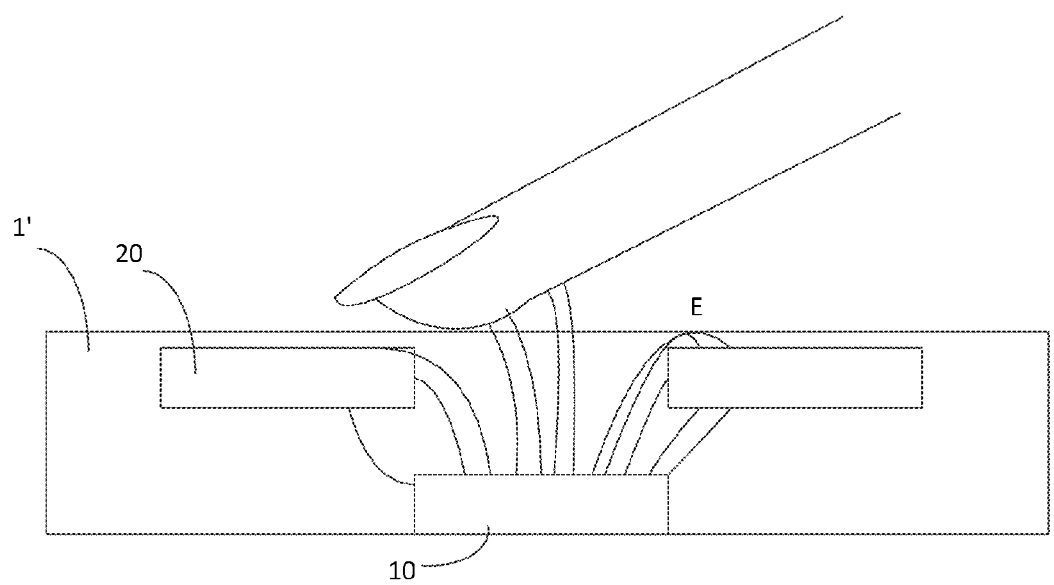
Figure 2A:
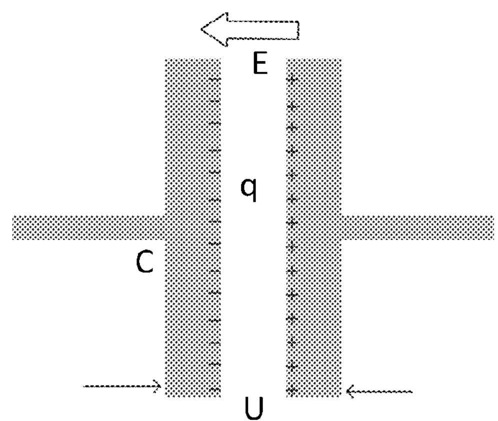
FIGS. 2A to 2E depicts the electric charges and capacitances of the conductors in variety locations.
Figure 2B:
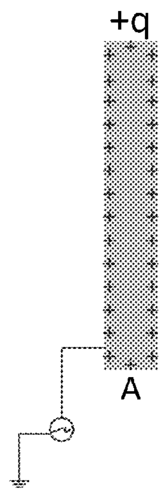
Figure 2C:
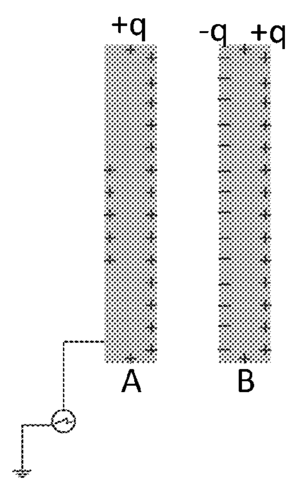
Figure 2D:
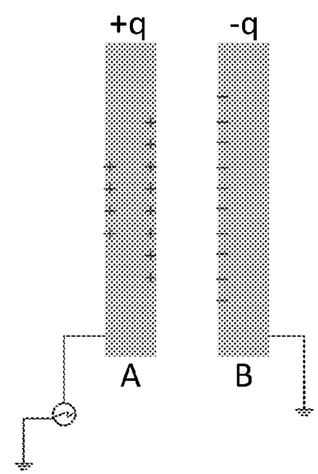
Figure 2E:
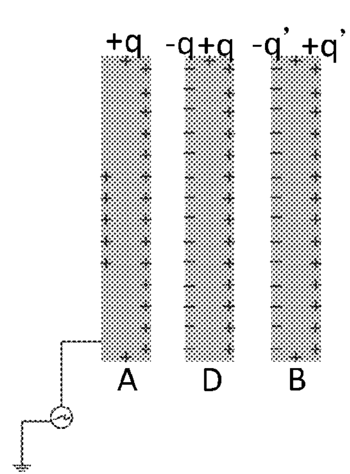
Figure 3A:
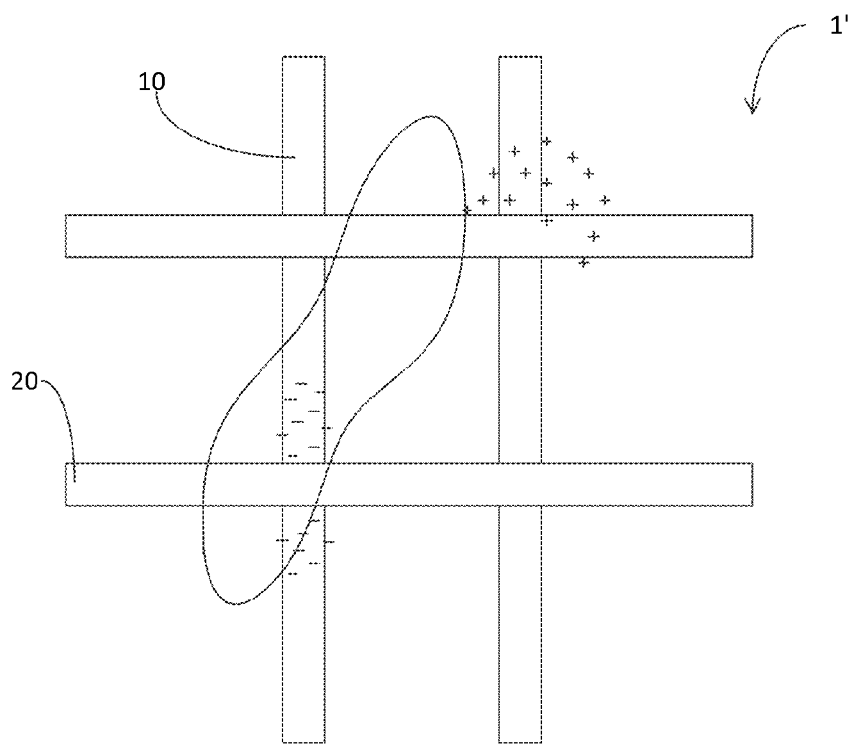
FIGS. 3A and 3B respectively depicts the liquid covering the different areas on the surface of the touch panel.
Figure 3B:
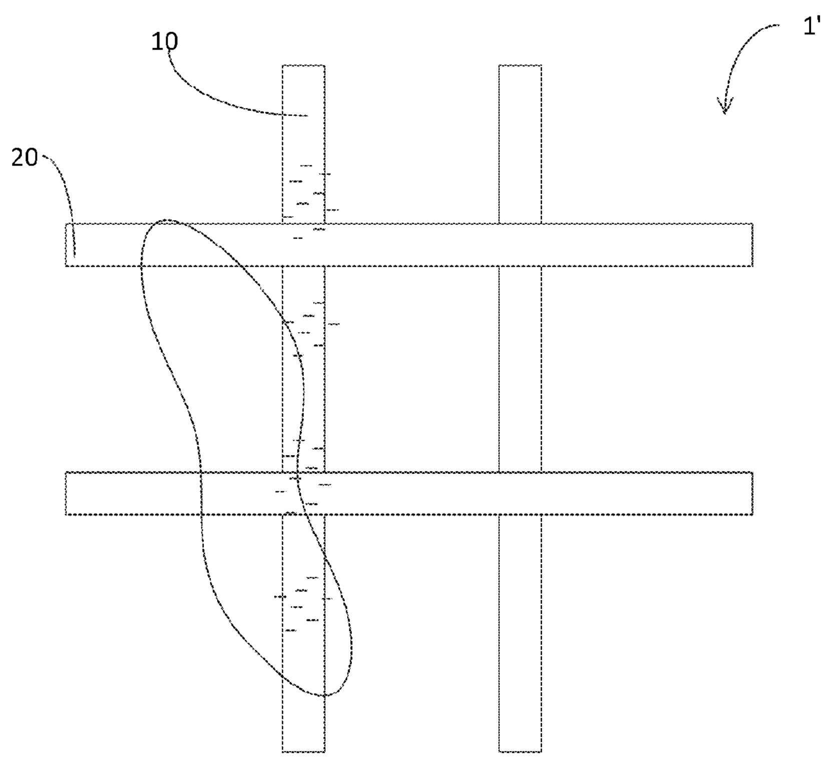

As shown in FIG. 1B, the detection process is proceeded by the processing module while there is a contact or approach on the substrate 1'. Refer to FIG. 6, the first detection process starts from the driving electrodes $X_1$, and the driving electrodes $X_1$ is charged from the state of low electric potential to the state of high electric potential in when the sensing electrodes $Y_{1\sim m}$ remain at the grounded state.

During a period between time points t2 and t4, the driving electrodes $X_1$ remain at the state of high electric potential. At time point t3, the sensing electrodes $Y_{1\sim m}$ are switched to a floating state after a first time lag and remain during a period between time points t3 and t6, thereby the sensing electrodes $Y_{1\sim m}$ charged for a short period between time points t3 and t4 with an integrated circuit or with an inductive electric-field channel $(X_n,Y_m)$ formed between the driving electrode and the sensing electrode. During a second time lag between time points t4 and t6, the charging of the sensing electrodes $Y_{1\sim m}$ is stopped; in the meanwhile, the driving electrode $X_1$ are connected to ground and switched from the state of high electric potential to the state of low electric potential at time point t4, while the senor electrodes $Y_{1\sim m}$ are kept on the floating state. Then, the sensing electrodes $Y_{1\sim m}$ are connected to ground and switched from the floating state to the grounding state at time point t6. Finally, a plurality of sensing signals are generated on the sensing electrodes $Y_{1\sim m}$ sequentially measured by the analog-to-digital converter after a third time lag. The driving electrodes $X_{1\sim n}$ are sequentially driven, and said detection process is repeated for gathering more sensing signals.

In the repeated cycle of said detection process, a positive signal $R_n$ is outputted if any value of the sensing signal on the sensing electrodes $Y_{1\sim m}$ is higher than or equal to the value of the baseline signal. Then, the processing module compares the value of the positive signal $R_n$ with a first threshold value $L_u$, wherein the first threshold value $L_u$ is defined as a value higher than the value of the baseline signal. If the value of the positive signal $R_n$ is higher than or equal to the first threshold value $L_u$, there is at least one contact or approach on the substrate 1', and the contact signal with a location information is outputted and stored in the register. If the value of the positive signal $R_n$ is smaller than the first threshold value $L_u$, the contact signal is discarded.

Figure 10:
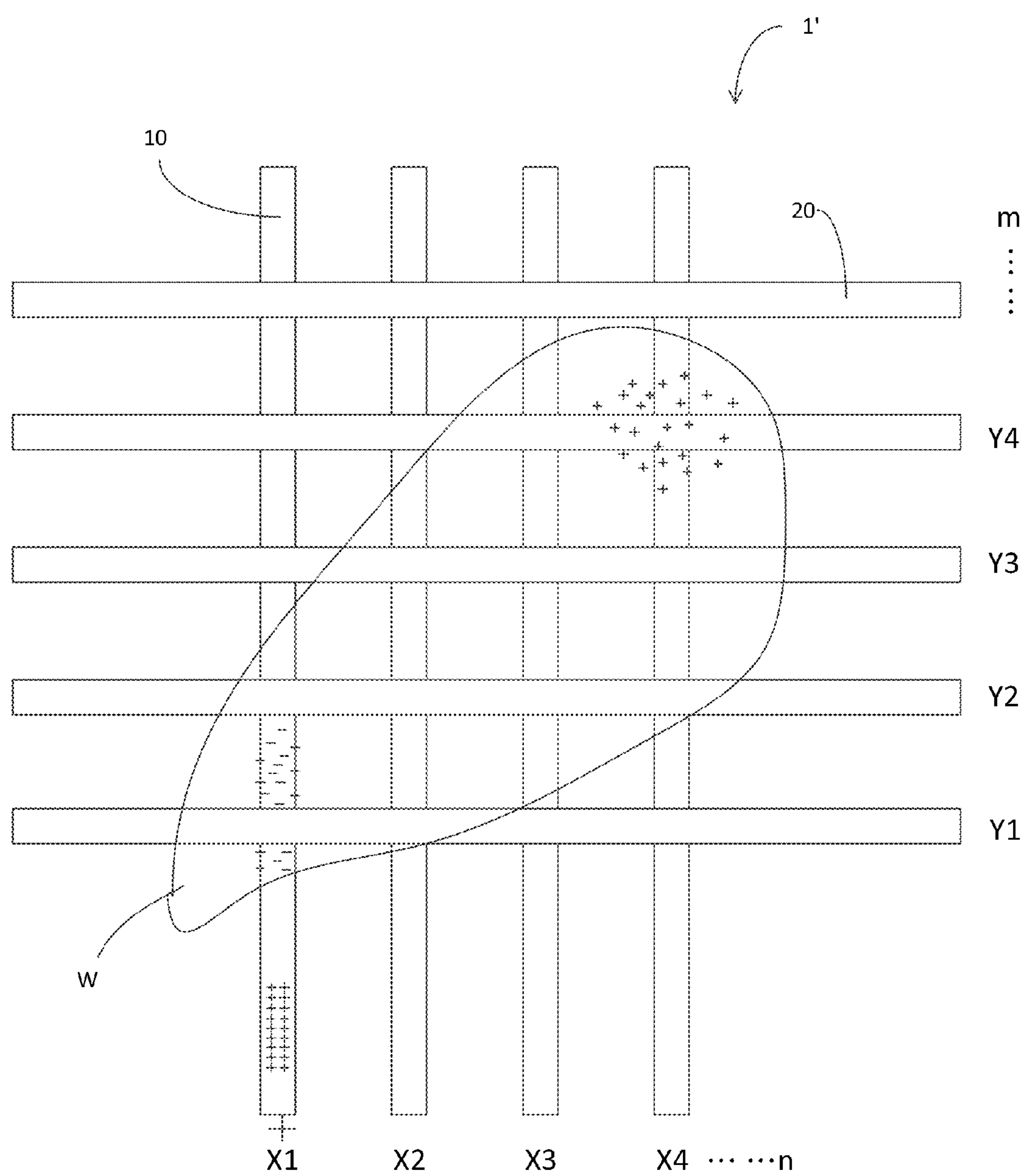
FIG. 10 depicts the liquid covering on the surface of the touch panel.

In one embodiment as shown in FIG. 10, the polar medium W (e.g., liquid) is on the substrate 1', and covers a part of the driving electrodes $X_n$ and a part of the sensing electrodes $Y_m$. The inductive electric-field channel $(X_n,Y_m)'$ between the sensing electrodes and the driving electrodes is intervened by the polar medium W. In the first detection process, polar medium W generate polarization phenomena while the sensing electrode $Y_1$ is charged by the inductive electric-field channel $(X_1,Y_1)'$. It results in the negative signal measured on the sensing electrode $Y_1$ by the analog-to-digital converter. However, the inductive electric-field channel $(X_4,Y_4)'$ far from the sensing electrode $Y_1$ relatively generates a positive value, and the positive value induces the electric-field with the sensing electrode $Y_4$. It makes erroneous identification of the location information due to the positive signal being measured on the sensing electrode $Y_4$ by the analog-to-digital converter. Therefore, the present invention provides said exclusion process for installing an exclusion area for discarding the erroneous identification of the location information while the negative signal is generated because of the polar medium W.

In the cycle of said exclusion process, after a plurality of sensing signals on the sensing electrodes $Y_{1\sim m}$ are measured by the analog-to-digital converter, the processing module compares the values of the sensing signals $Y_{1\sim m}$ with the value of the baseline signal. A negative signal $R_n$ is outputted if the value of the sensing signal is lower than the value of the baseline signal; and then, the processing module compares the value of the negative signal $R_n$ with a second threshold value $L_L$, wherein the second threshold value $L_L$ is defined as a value lower than the value of the baseline signal. When the negative signal with a location information is delivered to the processing module, the processing module defines the location information as $(X_n,Y_m)$ and installs an exclusion area as $(X_{n-p\sim n+q}, Y_{m-p\sim m+q})$. If the value of the negative signal $R_n$ is lower than the second threshold value $L_L$, the negative signal with the location information as (Xn, Ym) is stored in the register, and the processing module discards another location information (X, Y) if it is in the exclusion area $(X_{n-p\sim n+q}, Y_{m-p\sim m+q})$. If the value of the negative signal $R_n$ is higher than or equal to the second threshold value $L_L$, the processing module determines if the location information (X, Y) is in the exclusion area $(X_{n-p\sim n+q}, Y_{m-p\sim m+q})$. If the location information (X, Y) is in the exclusion area $(X_{n-p\sim n+q}, Y_{m-p\sim m+q})$, the exclusion area is uninstalled by the processing module and the location information (X, Y) is stored in the register; if not, the processing module takes no action. Therefore, the erroneous identification of the location information can be discarded after the exclusion process, and it can decrease erroneous actions on the touch panel.

In the preferred embodiment, said measurement process, said detection process for the contact signal and said exclusion process for installing the exclusion area are simultaneously implemented. The contact signal with the location information is timely determined in the processing cycle, the location information is delivered to a CPU while the location information is not in the exclusion area. The present invention can strengthen the response time and accurate identification.

What is claimed is:

1. A touch recognition method for a touch panel, the touch panel including a plurality of driving electrodes and a plurality of sensing electrodes, the method comprising:

initializing the driving electrodes and the sensing electrodes, including setting the driving electrodes and the sensing electrodes to a state of Low electric potential;

charging the driving electrodes to a state of High electric potential;

switching the sensing electrodes to a floating state, during which the sensing electrodes are charged for a short period with an integrated circuit including an analog-to-digital converter;

stopping the charging of the sensing electrodes, and switching the driving electrodes from the state of High electric potential to the state of Low electric potential, while the sensor electrodes are kept in the floating state; and generating a plurality of sensing signals on the sensing electrodes sequentially measured by the analog-to-digital converter.

2. The method according to claim 1, wherein the sensing signal is defined as a baseline signal if there is no contact or approach on the surface of the touch panel with any object, and the sensing signal is defined as a contact signal if there is any contact or approach on the surface of the touch panel with any object.

3. The method according to claim 2, further comprising:

comparing the values of the sensing signals with the value of the baseline signal; and outputting a positive signal if the value of the sensing signal is higher than or equal to the value of the baseline signal.

4. The method according to claim 3, further comprising:

comparing the value of the positive signal with a first threshold value higher than the value of the baseline signal; and outputting the contact signal with a location information if the value of the positive signal is higher than or equal to the first threshold value.

5. The method according to claim 2, further comprising:

comparing the values of the sensing signals with the value of the baseline signal;

outputting a negative signal if the value of the sensing signal is lower than the value of the baseline signal, the negative signal including a location information; and defining the location information as (X,Y) and installing an exclusion area as (X±p, Y±q), wherein the p and the q are natural numbers.

6. The method according to claim 5, further comprising:

comparing the value of the negative signal with a second threshold value lower than the value of the baseline signal;

outputting an exceptional signal if the value of the negative signal is lower than the second threshold value;

installing the exclusion area according to the exceptional signal; and, discarding a new location information if the new location information is in the exclusion area.

7. The method according to claim 5, further comprising:

comparing the value of the negative signal with a second threshold value lower than the value of the baseline signal;

outputting an restoring signal if the value of the negative signal is higher than the second threshold value; and uninstalling the exclusion area according to the restoring signal.

8. A touch panel, including a plurality of driving electrodes and a plurality of sensing electrodes, the touch panel comprising:

a plurality of driving circuits, each of the driving circuits being electrically connected to a corresponding driving electrode;

an integrated circuit, including an analog-to-digital converter and being electrically connected to the sensing electrodes; and a processing module, being electrically coupled to the driving circuits and the integrated circuit, wherein the processing module delivers a driving signal to the driving circuits for charging the driving electrodes to a state of High electric potential when the sensing electrodes are in a state of Low electric potential; the processing module switches the sensor electrodes to a floating state from the state of Low electric potential during which the sensing electrodes are charged for a short period with the integrated circuit; the integrated circuit stops the charging of the sensing electrodes, and the processing module switches the driving electrodes from the state of High electric potential to the state of Low electric potential; and a plurality of sensing signals are generated on the sensing electrodes, which are sequentially measured by the analog-to-digital converter.

9. The touch panel according to claim 8, wherein the sensing signal is defined as a baseline signal if there is no contact or approach on the surface of the touch panel with any object, and the sensing signal is defined as a contact signal if there is any contact or approach on the surface of the touch panel with any object.

10. The touch panel according to claim 9, further comprising a comparator, the comparator compares the values of the sensing signals with the value of the baseline signal, and a positive signal is outputted if the value of the sensing signal is higher than or equal to the value of the baseline signal.

11. The touch panel according to claim 10, wherein the comparator compares the value of the positive signal with a first threshold value higher than the value of the baseline signal, and the contact signal with a location information is outputted if the value of the positive signal is higher than or equal to the first threshold value.

12. The touch panel according to claim 9, further comprising a comparator, the comparator compares the values of the sensing signals with the value of the baseline signal, and a negative signal including a location information is outputted if the value of the sensing signal is lower than the value of the baseline signal.

13. The touch panel according to claim 12, wherein the comparator compares the value of the negative signal with a second threshold value lower than the value of the baseline signal, and an exceptional signal is outputted if the value of the negative signal is lower than the second threshold value.

14. The touch panel according to claim 12, wherein the comparator compares the value of the negative signal with a second threshold value lower than the value of the baseline signal, and an restoring signal is outputted if the value of the negative signal is higher than the second threshold value.

15. The touch panel according to claim 12, wherein the location information is defined as (X,Y) and an exclusion area is installed as (X±p, Y±q), which the p and the q are natural numbers.

16. The touch panel according to claim 15, wherein the comparator compares the value of the negative signal with a second threshold value lower than the value of the baseline signal, and an exceptional signal is outputted if the value of the negative signal is lower than the second threshold value.

17. The touch panel according to claim 15, wherein the comparator compares the value of the negative signal with a second threshold value lower than the value of the baseline signal, and an restoring signal is outputted if the value of the negative signal is higher than the second threshold value.

18. A touch recognition method for a touch panel, the touch panel including a plurality of driving electrodes and a plurality of sensing electrodes, the method comprising:

performing a first measuring process for obtaining a baseline signal;

performing a second measuring process for obtaining a contact signal if there is any contact or approach of the touch panel with any object;

comparing the values of the baseline signal with the contact signal for generating the contact signal with a location information;

performing a third measuring process for installing an exclusion area according to the baseline signal;

determining whether the location information is in the exclusion area; and, discarding the location information if the location information is in the exclusion area.

19. The method according to claim 18, wherein the third measuring process further comprising:

generating a restoring signal according to the baseline signal and the contact signal with the location information;

uninstalling the exclusion area according to the restoring signal; and, transmitting the contact signal with the location information to a register.

* * * * *